(12) United States Patent
Gibson et al.

(10) Patent No.: US 7,793,146 B1
(45) Date of Patent: Sep. 7, 2010

(54) METHODS FOR STORING DATA IN A DATA STORAGE SYSTEM WHERE A RAID-X FORMAT OR FORMATS ARE IMPLEMENTED AT A FILE LEVEL

(75) Inventors: Garth A. Gibson, Pittsburgh, PA (US); Daniel Belov, San Francisco, CA (US)

(73) Assignee: Panasas, Inc., Pittsburgh, PA (US)

( * ) Notice: Subject to any disclaimer, the term of this patent is extended or adjusted under 35 U.S.C. 154(b) by 424 days.

(21) Appl. No.: 11/959,658

(22) Filed: Dec. 19, 2007

Related U.S. Application Data

(63) Continuation-in-part of application No. 11/835,147, filed on Aug. 7, 2007, now Pat. No. 7,681,072.

(51) Int. Cl.
  *G06F 11/00* (2006.01)
(52) U.S. Cl. .......................................... 714/6; 711/114
(58) Field of Classification Search .................. 714/5–7, 714/8, 42, 54; 711/100, 114
  See application file for complete search history.

(56) References Cited

U.S. PATENT DOCUMENTS

| 6,233,696 B1 * | 5/2001 | Kedem ........................... 714/6 |
| 6,985,995 B2 * | 1/2006 | Holland et al. ............... 711/114 |
| 7,681,072 B1 * | 3/2010 | Gibson et al. ................... 714/6 |
| 7,694,105 B2 * | 4/2010 | Sanvido ....................... 711/203 |
| 2004/0153730 A1 * | 8/2004 | Tanaka et al. .................. 714/6 |
| 2006/0156059 A1 * | 7/2006 | Kitamura ........................ 714/6 |
| 2006/0173956 A1 * | 8/2006 | Ulrich et al. ................. 709/203 |
| 2008/0178038 A1 * | 7/2008 | McNeill et al. ................. 714/5 |
| 2008/0209304 A1 * | 8/2008 | Winarski et al. ............. 714/763 |

OTHER PUBLICATIONS

Muthian Sivathanu, et al. "Improving Storage System Availability with D-GRAID," *Appears in the Third USENIX Symposium on File and Storage Technologies (FAST '04)*, pp. 1-16.

* cited by examiner

*Primary Examiner*—Dieu-Minh Le
(74) *Attorney, Agent, or Firm*—Morgan, Lewis & Bockius LLP (57) ABSTRACT

A data storage system where a RAID-X format is implemented at a file level includes storage devices, and one or more nodes that access files from the storage devices. N represents a maximum limit of failures beyond which reconstruction of a file stored using the file level implementation is not possible. A directory is encoded for each of a plurality of files, and a map is encoded that includes a list of storage devices where components of the directory associated with the map reside. The encoding of the directory is performed using a RAID-X format that can tolerate at least N+1 failures prior to being unable to reconstruct the directory.

3 Claims, 7 Drawing Sheets

Directory D contents: /D/F, /D/G, /D/H, /D/S

Directory D:

| | |
|---|---|
| disk A | disk B | file F metadata:

| | |
|---|---|
| disk A | disk C | file G metadata:

| | |
|---|---|
| disk B | disk D | file H metadata:

| | |
|---|---|
| disk C | disk B | subdir S metadata:

| | |
|---|---|
| disk D | disk A |

File /D/F map:
RAID type = RAID 4
Stripe width = 4
Disks = A, B, C, D
Metadata = A, C
Fault tolerance = 1

Directory /D map:
RAID type = RAID 1
Replicas = 1
Disks = A, B
Metadata = A, B
Fault tolerance = 1

File /D/F back-pointer:
(stored in F's metadata)
Parent directory = D
Filename = "F"

Fig. 7

METHODS FOR STORING DATA IN A DATA STORAGE SYSTEM WHERE A RAID-X FORMAT OR FORMATS ARE IMPLEMENTED AT A FILE LEVEL

FIELD OF THE INVENTION

The present invention is directed to systems and methods for facilitating file reconstruction and restoration in data storage systems where a RAID-X format is implemented at a file level within a plurality of storage devices.

BACKGROUND OF THE INVENTION

With increasing reliance on electronic means of data communication, different models to efficiently and economically store a large amount of data have been proposed. In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client. By contrast, in an object-based data storage system, each object-based storage device communicates directly with clients over a network. An example of an object-based storage system is shown in commonly-owned, U.S. Pat. No. 6,985,885, filed on Mar. 29, 2002, titled "Data File Migration from a Mirrored RAID to a Non-Mirrored XOR-Based RAID Without Rewriting the Data," incorporated by reference herein in its entirety.

The present invention includes various improvements over existing systems, and provides solutions for facilitating file reconstruction and restoration in data storage systems where a RAID-X format is implemented at a file level within a plurality of storage devices.

SUMMARY OF THE INVENTION

The present invention is directed to a data storage system that includes a plurality of storage devices, and one or more nodes that access files from the storage devices. A RAID-X format is implemented at a file level within the plurality of storage devices. In response to a failure that renders inaccessible at least one portion of a storage device, a map is retrieved for at least one file having at least one component stored on the at least one portion. The map includes a list of storage devices where components of the at least one file reside. The map is used to determine whether a number of lost or damaged components associated with the at least one file exceed a maximum limit beyond which reconstruction of a file stored using the file level implementation of the RAID-X format is not possible. If the maximum limit for reconstruction of a file stored using the RAID-X format has not been exceeded, the at least one file is reconstructed. The data storage system continues to service data storage and access requests, with reconstruction of the at least one file being performed as a background operation, after a number of device failures has occurred which would have exceeded the maximum limit of storage device failures for reconstruction had the file been stored using a volume level implementation (discussed below) of the RAID-X format. In one embodiment, the failure corresponds to only a single sector failure of a storage device, and only a file lost or damaged as a result of the single sector failure is reconstructed. The data storage system is optionally a distributed, object-based data storage system, where each of the storage devices is an object-based storage device.

In accordance with a further aspect, the present invention is directed to a data storage system that includes a plurality of storage devices, and one or more nodes that access files from the storage devices. A RAID-X format is implemented at a file level within the plurality of storage devices. In response to a failure of one or more of the storage devices, a map is retrieved for at least one file having at least one component stored on the one or more failed storage devices. The map includes a list of storage devices where components of the at least one file reside. The map is used for determining whether the number of lost or damaged components associated with the at least one file exceed a maximum limit beyond which reconstruction of a file stored using the file level implementation of the RAID-X format is not possible, and one or more lost or damaged files are identified where the maximum limit for reconstruction of the file stored using the file level implementation of the RAID-X format has been exceeded (collectively, "the Determining and Identification Functions"). The data storage system continues to service data storage and access requests, with the Determining and Identification Functions being performed as a background operation, after a number of device failures has occurred which would have exceeded the maximum limit of storage device failures for reconstruction had the file been stored using a volume level implementation of the RAID-X format. A list of the one or more lost/damaged files are provided to an administrator in order to facilitate a manual restore from backup of the one or more lost/damaged files. In addition (or alternatively), for each of the one or more lost/damaged files, a most recent version of the file is automatically retrieved from a backup location. The data storage system is optionally a distributed, object-based data storage system, where each of the storage devices is an object-based storage device.

In one embodiment, the Determining and Identification Functions include identifying a set of lost or damaged files where, for each file in the set, the maximum limit for reconstruction of the file stored using the file level implementation of the RAID-X format has been exceeded. In this embodiment, a list of the set of lost or damaged files is provided to an administrator in order to facilitate a manual restore from backup of the files in the set. In addition (or alternatively), for each lost or damaged file in the set, if an online backup copy of the file is available from a backup location, a most recent version of the file is automatically retrieved from the backup location. In examples of this embodiment, the backup location corresponds to an automatically-mounted backup tape, a manually-mounted backup tape, a remote archive copy of the file, a local archive copy of the file, a remote mirror copy of the file, or a local mirror copy of the file.

In another embodiment, the data storage system maintains at least one point-in-time copy of at least part of an image of the data storage system, and the system reverts to a most recent version of the point-in-time copy prior to providing the list of the one or more lost files to the administrator and/or automatically retrieving the most recent version of the file from the backup location. In one embodiment, the point-in-time copy optionally corresponds to a most recent version of a complete point-in-time copy of an image of the data storage system.

In embodiments where the data storage system maintains a point-in-time copy of at least part of an image of the data storage system, each file retrieved from a most recent version of the point-in-time copy is optionally tagged. The tagging can be used to render each tagged file inaccessible until a tag is removed from the file, trigger a warning when a tagged file is accessed, deny access to each tagged file, audit-log access to each tagged file, permit access to a tagged file only if the access is accompanied by an override flag, allow access to a tagged file only if an administrator provides an override, and/or interactively query a user whether use of a tagged file is acceptable. Optionally, tagging is only applied to those files retrieved from the most recent version of a point-in-time copy which correspond to a lost or damaged file modified after a time when such point-in-time copy was made.

In embodiments where retrieved files are tagged, information associated with tagged files retrieved from the most recent version of the point-in-time copy is reviewed, and based on the reviewing, a determination is made whether to restore a lost/damaged file from the most recent version of the point-in-time copy, delete the lost/damaged file, or use the lost/damaged file in a damaged state. The reviewing may be performed manually by an administrator. Alternatively, a policy may be set by the system that automatically decides how to handle lost or damage files. In one example, such a policy would progress in two phases: (1) the system automatically enables the user to access to the lost or damaged file; (2) the user or administrator decides if they want to use the lost/damaged file or the old (restored) file.

In a still further embodiment, the invention may be used for reconstruction of only a part of a file. In this embodiment, the system responds to a failure that renders inaccessible at least one portion of a storage device by retrieving a map for a file having at least one component stored on the at least one portion. The map includes a list of storage devices where components of the part reside, and the part corresponds to less than all parts of the file. The map is used to determine whether a number of lost or damaged components associated with the part of the file exceed a maximum limit beyond which reconstruction of the part of the file stored using the file level implementation of the RAID-X format is not possible. If the maximum limit for reconstruction using the RAID-X format has not been exceeded, the part of the file is reconstructed while leaving remaining parts of the file intact. The data storage system continues to service data storage and access requests, with reconstruction of the part of the file being performed as a background operation, after a number of device failures has occurred which would have exceeded the maximum limit of storage device failures for reconstruction had the part of the file been stored using a volume level implementation of the RAID-X format.

The above aspects of the invention can also be used for reconstruction of virtualized objects stored as aggregations of multiple component objects, each stored on an object-based storage device, where the virtualized objects contain data from one or more logical files, or a portion of a logical file.

In accordance with a still further aspect, the present invention is directed to a data storage system that includes a plurality of storage devices, and one or more nodes that access files from the storage devices. A RAID-X format is implemented at a file level within the plurality of storage devices, and N represents a maximum limit of failures beyond which reconstruction of a file stored using the file level implementation of the RAID-X format is not possible. A directory is encoded for each of a plurality of files stored on the storage system. A map is encoded that includes a list of storage devices where components of the directory associated with the map reside. The encoding of the directory is performed using a RAID-X format that can tolerate at least N+1 failures prior to being unable to reconstruct the directory. The data storage system is a distributed, object-based data storage system, and each of the storage devices is an object-based storage device.

In accordance with a still further aspect, the present invention is directed to a data storage system that includes a plurality of storage devices, and one or more nodes that access files from the storage devices. A RAID-X format is implemented at a file level within the plurality of storage devices. A directory (D) is stored on a set of storage devices such that no file or subdirectory contained in D has associated metadata on the exact same set of storage devices where D is stored. Metadata of each child of D includes a back-pointer to D that identifies at least a parent directory and a filename in the parent directory. Wall storage devices in the set used to store D fail, all children of D have at least one surviving metadata component which can be used to identify locations in a filesystem namespace associated with the data storage system of all of said children. The data storage system is optionally a distributed, object-based data storage system, where each of the storage devices is an object-based storage device.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

Embodiments set forth below correspond to examples of object-based data storage implementations of the present invention. It will be understood by those skilled in the art that various teachings of the present invention can be applied in both object-based data storage systems, as well as other data storage systems.

A. General Operation of Object-Based Data Storage System

Figure 1:
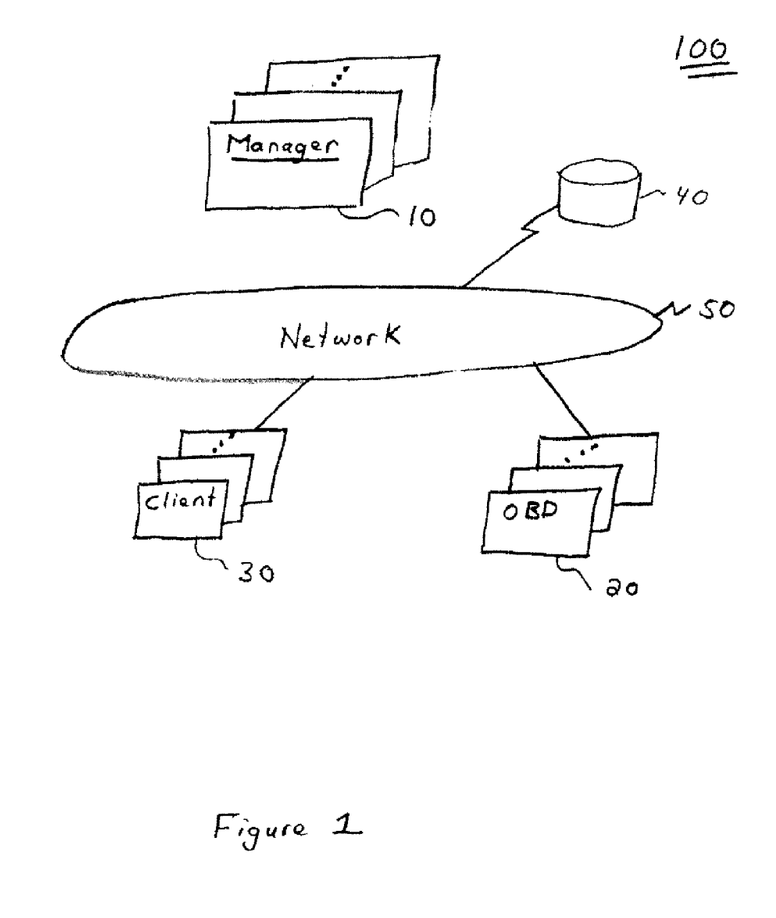
FIG. 1 illustrates an exemplary network-based file storage system designed around Object-Based Secure Disks (OBDs)

FIG. 1 illustrates an exemplary network-based file storage system 100 designed around Object Based Secure Disks (OBDs) 20. File storage system 100 is implemented via a combination of hardware and software units and generally consists of manager software (simply, the "manager") 10, OBDs 20, clients 30 and metadata server 40. It is noted that each manager is an application program code or software running on, e.g., a corresponding server such as a metadata server 40. Clients 30 may run different operating systems, and present a file system interface which may be integrated with the operating system. Metadata stored on or managed by server 40 may include file and directory object attributes as well as directory object contents. The term "metadata" generally refers not to the underlying data itself, but to the attributes or information that describe that data.

FIG. 1 shows a number of OBDs 10 attached to the network 50. An OBD 10 is a physical disk drive that stores data files in the network-based system 100 and may, for example, have the following properties: (1) it presents an object-oriented interface (rather than a sector-oriented interface); (2) it attaches to a network (e.g., the network 50) rather than to a data bus or a backplane (i.e., the OBDs 10 may be considered as first-class network citizens); and (3) it enforces a security model to prevent unauthorized access to data stored thereon.

The fundamental abstraction exported by an OBD 10 is that of an "object," which may be defined as a variably-sized ordered collection of bits. Contrary to more traditional block-based storage disks, OBDs do not primarily export a sector-based interface, but instead export an object-based interface which provides commands for manipulating objects. Objects on an OBD can be created, removed, written, read, appended to, etc. The OBD may also provide commands for manipulating collections or groups of objects as a whole. OBDs do not require the host to manage the disk geometry or block allocation, and may implement layout optimizations internally, utilizing higher-level information that can be provided through the object-based storage protocol the OBD implements. In one embodiment, each data file and each file directory in the file system 100 are stored using one or more OBD objects. Because of object-based storage of data files, each file object may generally be read, written, opened, closed, expanded, created, deleted, moved, sorted, merged, concatenated, named, renamed, and include access limitations. Each OBD 10 communicates directly with clients 30 on the network 50, possibly through routers and/or bridges. The OBDs, clients, managers, etc., may be considered as "nodes" on the network 50. In system 100, no assumption needs to be made about the network topology except that various nodes should be able to contact other nodes in the system either directly or through a proxy. Servers (e.g., metadata servers 40) in the network 50 merely enable and facilitate data transfers between clients and OBDs, but the servers do not normally implement such transfers.

Logically speaking, various system "agents" (i.e., the managers 10, the OBDs 20 and the clients 30) are independently-operating network entities. Manager 10 may provide day-to-day services related to individual files and directories, and manager 10 may be responsible for all file- and directory-specific states. Manager 10 creates, deletes, and sets attributes on entities (i.e., files or directories) on clients' behalf. Manager 10 also carries out the aggregation of OBDs for performance and fault tolerance. "Aggregate" objects are objects that use OBDs in parallel and/or in redundant configurations, yielding higher availability of data and/or higher I/O performance. Aggregation is the process of distributing a single data file or file directory over multiple OBD objects, for purposes of performance (parallel access) and/or fault tolerance (storing redundant information). The aggregation scheme associated with a particular object may optionally be stored as an attribute of that object on an OBD 20. A system administrator (e.g., a human operator or software) may choose any aggregation scheme for a particular object. Both files and directories can be aggregated. In one embodiment, a new file or directory inherits the aggregation scheme of its immediate parent directory, by default. Manager 10 may be allowed to make layout changes for purposes of load or capacity balancing.

The manager 10 may also allow clients to perform their own I/O to aggregate objects (which allows a direct flow of data between an OBD and a client), as well as providing proxy service when needed. As noted earlier, individual files and directories in the file system 100 may be represented by unique OBD objects. Manager 10 may also determine exactly how each object will be laid out—i.e., on which OBD or OBDs that object will be stored, whether the object will be mirrored, striped, parity-protected, etc. Manager 10 may also provide an interface by which users may express minimum requirements for an object's storage (e.g., "the object must still be accessible after the failure of any one OBD").

Each manager 10 may be a separable component in the sense that the manager 10 may be used for other file system configurations or data storage system architectures. In one embodiment, the topology for the system 100 may include a "file system layer" abstraction and a "storage system layer" abstraction. The files and directories in the system 100 may be considered to be part of the file system layer, whereas data storage functionality (involving the OBDs 20) may be considered to be part of the storage system layer. In one topological model, the file system layer may be on top of the storage system layer.

A storage access module (SAM) (not shown) is a program code module that may be compiled into managers and clients. The SAM includes an I/O execution engine that implements simple I/O, mirroring, and map retrieval algorithms discussed below. The SAM generates and sequences the OBD-level operations necessary to implement system-level I/O operations, for both simple and aggregate objects.

Each manager 10 maintains global parameters, notions of what other managers are operating or have failed, and provides support for up/down state transitions for other managers. A benefit to the present system is that the location information describing at what data storage device (i.e., an OBD) or devices the desired data is stored may optionally be located at a plurality of OBDs in the network. In such an embodiment, a client 30 need only identify one of a plurality of OBDs containing location information for the desired data to be able to access that data. The data may be returned to the client directly from the OBDs without passing through a manager.

Figure 5:
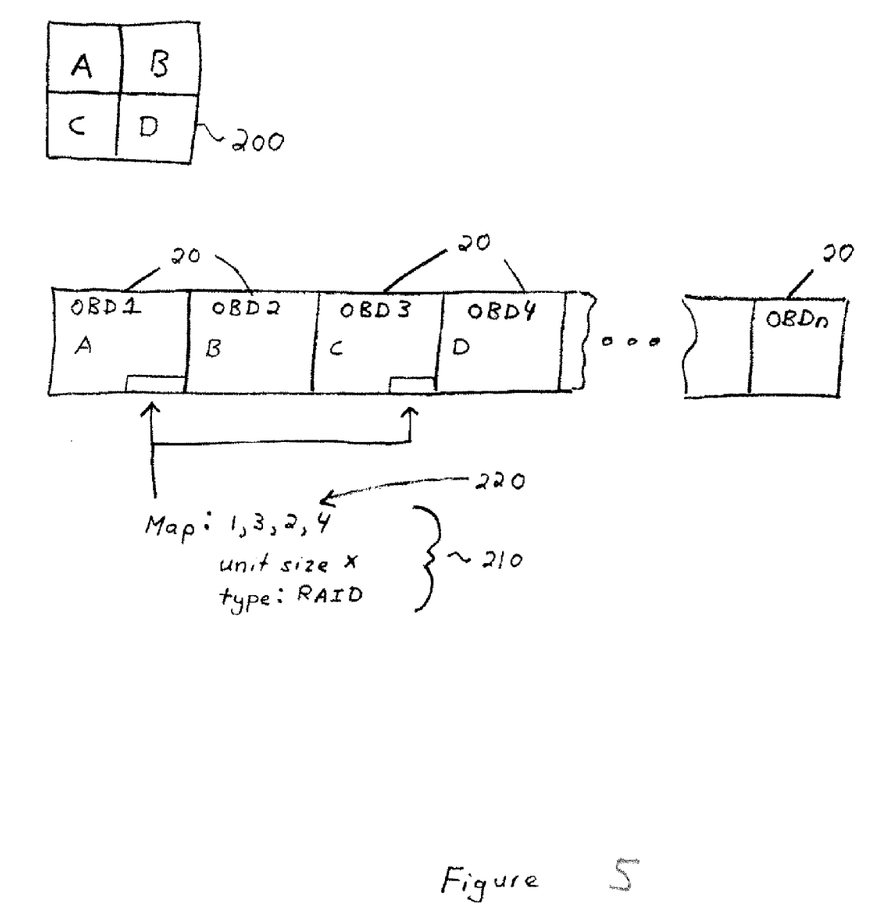
FIG. 5 illustrates a map of a file object having multiple components on different OBDs.

FIG. 5 illustrates the decentralized storage of a map 210 of an exemplary file object 200 having multiple components (e.g., components A, B, C, and D) stored on different OBDs 20, in accordance with the present invention. In the example shown, the object-based storage system includes n OBDs 20 (labeled OBD1, OBD2 . . . OBDn), and the components A, B, C, and D of exemplary file object 200 file are stored on OBD1, OBD2, OBD3 and OBD4, respectively. A map 210 that includes, among other things, a list 220 of object storage devices where the components of exemplary file object 200 reside. Map 210 is stored as at least one component object attribute on an object storage device (e.g., OBD1, OBD3, or both) and includes information about organization of the components of the file object on the object storage devices on the list. For example, list 220 specifies that the first, second, third and fourth components (i.e., components A, B, C and D) of file object 200 are stored on OBD1, OBD3, OBD2 and OBD4, respectively. In the embodiment shown, OBD1 and OBD3 contain redundant copies of map 210.

In one embodiment, exemplary file object 200 having multiple components on different object storage devices is accessed by issuing a file access request from a client 30 to an object storage device 20 (e.g., OBD1) for the file object. In response to the file access request, map 210 (which is stored as at least one component object attribute on the object storage device) is located on the object storage device, and sent to the requesting client 30 which retrieves the components of the requested file object by issuing access requests to each of the object storage devices listed on the map.

B. File Reconstruction where a Raid-X Format is Implemented at a File Level

The file reconstruction methodologies set forth herein are particularly applicable to data storage systems where a RAID-X format has been implemented at a file level. For purposes of this disclosure, a "RAID-X format" refers to any algorithm for distributing data across multiple storage devices, using striping and/or an error-correcting code, such as XOR-based parity or a Reed-Solomon code. Some examples of specific RAID-X formats include RAID-0, RAID-1, RAID-3, RAID-4, RAID-5, RAID-10, RAID-50, etc. For purposes of this disclosure, implementation of a RAID-X format at a file level means that, for a given file, (i) the file's data is broken-up into separate components (or stripe units), (ii) the filesystem allocates each component on a physical storage device with the separate components of the file being stored on different storage devices, and (iii) and the filesystem computes the RAID parity for the file in accordance with the physical boundaries of the separate components of the file on the different storage devices. Each file can have different RAID parameters (for example, stripe unit size, stripe width, etc.) and can be stored on a different combination of the available storage devices. The filesystem (implemented, e.g., on manager 10 and client(s) 30 in the example of FIG. 1) also maintains access to a map indicating the storage devices where the separate components of the file and the corresponding RAID parity information are stored.

Figure 2:
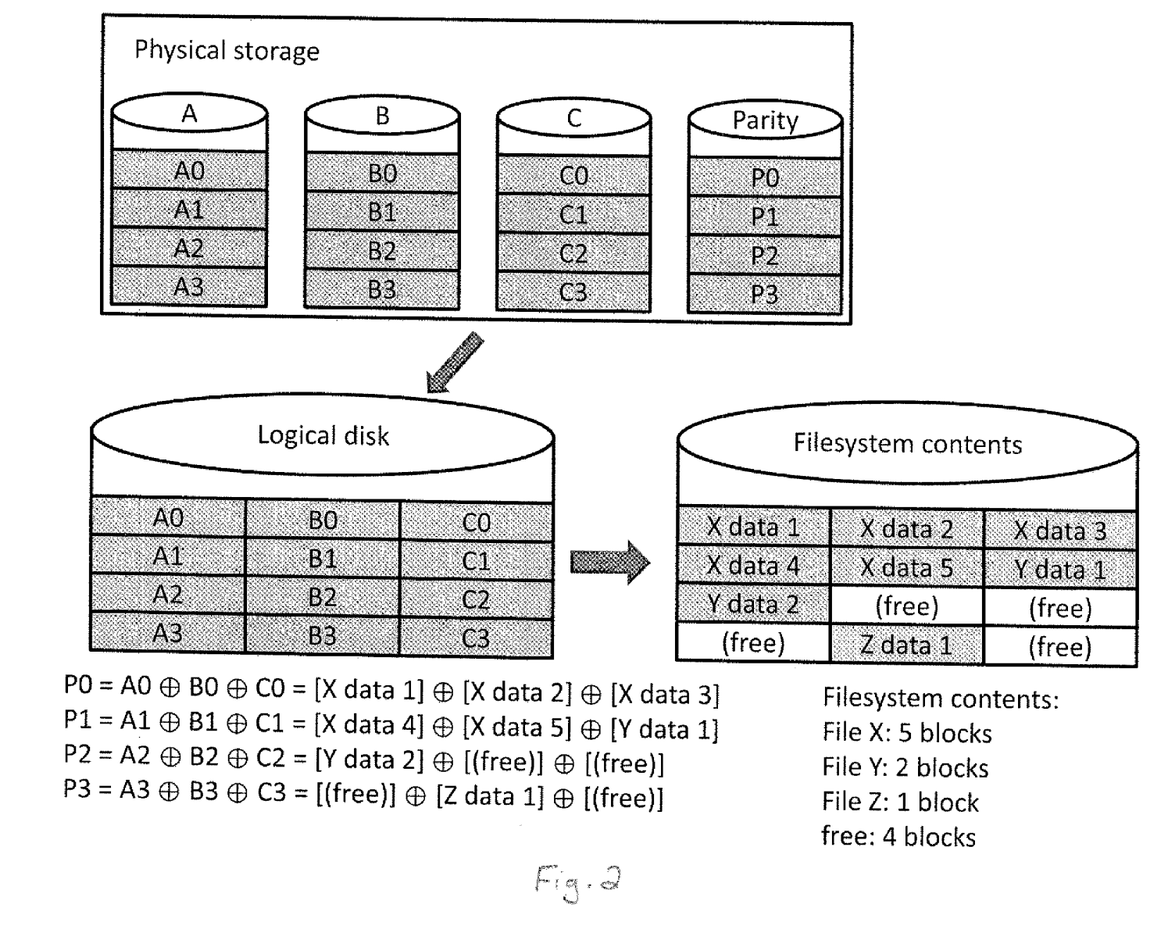
FIG. 2 illustrates an example of a volume level implementation of a RAID-X format, in accordance with the prior art.

Implementation of a RAID-X format at a file level is different from using a volume level (a "volume" corresponds to a failure domain) implementation of a RAID-X format. FIG. 2 shows an example of a volume level implementation of a RAID-X format. The storage system includes four physical disk drives, labeled A, B, C, and Parity in FIG. 2. Each disk has four data blocks, labeled A0 . . . A3, B0 . . . B3, etc. The disks are aggregated (by a RAID controller or software RAID driver (not shown)) into a single large "logical disk", shown in the lower left corner of FIG. 2. The logical disk contains 12 data blocks that are usable by the filesystem (the other four physical blocks are used by the RAID controller for parity). The filesystem allocates data blocks to store three files, named X (5 blocks), Y (2 blocks), and Z (1 block). For simplicity, filesystem level metadata (such as inodes, directory blocks, etc.) is not shown. The volume level implementation of the RAID-X format is marked by the following characteristics. First, for a given volume (e.g., disk drives A, B, C in FIG. 2), parity is computed across data blocks containing components of different files. Alternatively, in a volume level implementation, parity is computed across data blocks that contain component(s) of a given file and "free" space or other content that is unrelated to the given file. For example, parity block P1 is computed over data from file X and file Y. Parity block. P2 is computed over data from file Y and blocks that are logically considered "free" by the filesystem. Second, the filesystem (i.e., the module that maps file names to blocks or regions on the storage devices) has limited visibility into the parity computations, and in many cases does not even know it is using a logical disk provided by a RAID controller, rather than directly using a physical disk. In the example of FIG. 2, if two physical devices in the array fail (say, disks A and C), the entire contents of the system is lost, since that failure exceeds the fault tolerance of the RAID-X level in use (RAID-4 in this example). Even though the data in file Z was solely contained on a disk that survived (disk B), there is no way to access or retrieve it in a volume level implementation of a RAID-X format.

Figure 3:
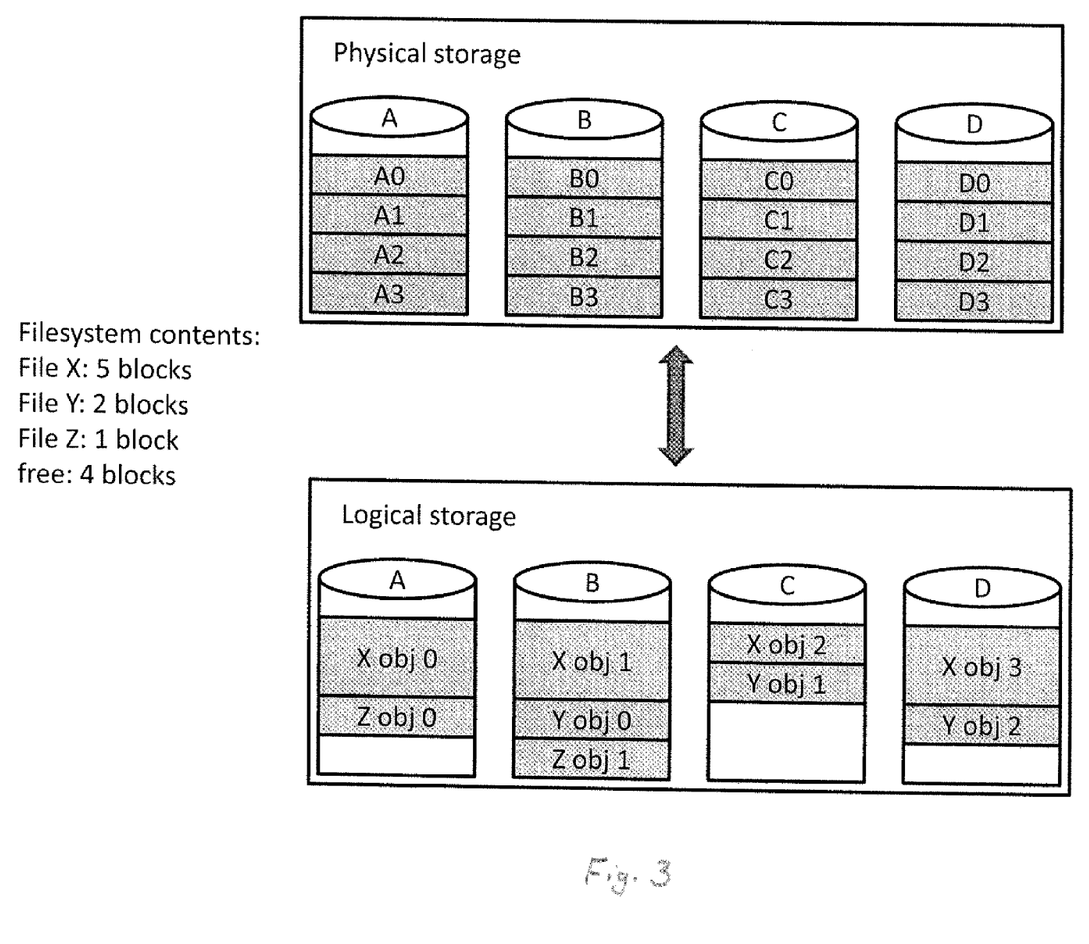
FIGS. 3 and 4 illustrate an example of an object-based data storage system where a RAID-X format has been implemented at the file level.
Figure 4:
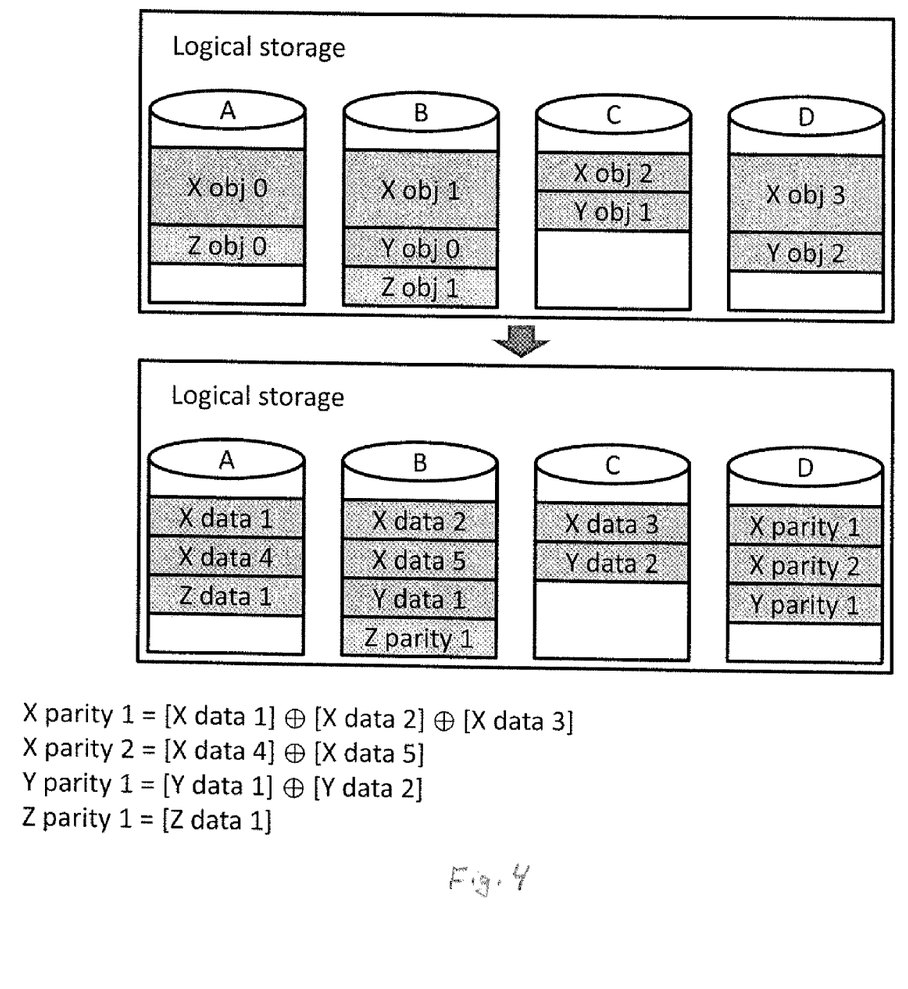

In contrast to FIG. 2, FIGS. 3 and 4 show an example of a file level RAID-X implementation in an object-based storage system. As was the case in the volume-level example, the storage system includes four physical disk drives, although in this case the disk drives are Object Based Disks (OBDs) instead of block-addressable disks. They are labeled A, B, C, and D in FIGS. 3 and 4 (there is no dedicated parity disk in this example). Instead of aggregating the disks into a single "logical disk", and hiding the parity computation underneath that aggregation, all four disks are individually visible to the filesystem. When the filesystem stores a file (for example, file X), it allocates a "component object" on each physical disk, and stores a portion of the file's data in each object. For a given file, the filesystem also computes the RAID parity over only the file's data (instead of over a volume that also contains content unrelated to the given file), and stores the parity in an additional component object. FIG. 3 shows the mapping from physical storage devices to component objects in a file level implementation of RAID-X. FIG. 4 shows how the file data is stored in the component objects. The file level implementation of the RAID-X format is marked by the following characteristics. First, as a general matter (i.e., for files larger than one stripe unit, or for at least 5% of files stored in the system), parity is computed separately over each file, in accordance with the physical boundaries of each component of the file stored in the system. For example, parity blocks "X parity 1" and "X parity 2" are computed only over data from file X. File Y's parity is stored in a different block ("Y parity 1"). Second, the filesystem is responsible for computing and storing parity, and has direct visibility to the physical storage devices. In the example of FIG. 4, if two storage devices in the array fail, a significant number of the files may be lost, but files that did not have a component object on both of the failed devices are recoverable. For example, if storage devices A and C fail, only file X is lost file Y and file Z are still recoverable, since each of them only lost one component and can be reconstructed based on their parity information.

One example of the file reconstruction methodologies of the present invention can be applied in the context of: (i) a data storage system (such as the one shown in FIG. 1) that includes a plurality of storage devices (e.g., OBDs 20) and one or more nodes (e.g., clients 30) that access files from the storage devices, (ii) where a RAID-X format is implemented at a file level within the plurality of storage devices. In response to a failure that renders inaccessible at least one portion of a storage device (e.g., at least one sector of an OBD 20), a map (e.g., map 210) is retrieved by the manager (e.g., Manager 10) for a file having at least one component stored on the inaccessible portion(s). The map includes a list of storage devices where components of the file reside. The manager uses the map, together with information about the inaccessible portion(s), to determine whether a number of lost or damaged components associated with the file exceed a maximum limit beyond which reconstruction of a file stored using the file level implementation of the RAID-X format is not possible. Optionally, one or more lost or damaged files are identified by the manager where the maximum limit for reconstruction of the file stored using the file level implementation of the RAID-X format has been exceeded.

A maximum limit exists beyond which reconstruction of a file stored using a file level implementation of a RAID-X format is not possible. This maximum limit is determined by the specific RAID-X algorithm in use. For example, a file stored using the RAID-5 algorithm (XOR-based parity) can tolerate at most one storage device failure. A maximum limit of storage device failures for reconstruction of a file stored using a volume level implementation of the RAID-X format also exists. Similarly to when the RAID-X algorithm is applied at the file level, this maximum limit is determined by the specific RAID algorithm in use for the volume.

If the maximum limit for reconstruction of at least one file stored using the RAID-X format has not been exceeded, the at least one file is reconstructed by the manager. Data storage system 100 continues to service data storage and access requests, with reconstruction of the file being performed as a background operation, after a number of device failures has occurred which would have exceeded the maximum limit of storage device failures for reconstruction had the file been stored using a volume level implementation of the RAID-X format. For purposes of this disclosure, a "background operation" means that the operation proceeds concurrently with the servicing of data storage and access requests.

In specific embodiments, the map (retrieved in response to the failure as described above) is used for determining whether a number of lost/damaged components associated with the file exceed a maximum limit beyond which reconstruction of a file stored using the file level implementation of the RAID-X format is not possible, one or more lost/damaged files are identified where the maximum limit for reconstruction of the file stored using the file level implementation of the RAID-X format has been exceeded (collectively, "the Determining and Identification Functions"), and the data storage system continues to service data storage and access requests, with the Determining and Identification Functions being performed as a background operation, after a number of device failures has occurred which would have exceeded the maximum limit of storage device failures for reconstruction had the file stored using a volume level implementation of the RAID-X format.

In certain embodiments, a list of one or more lost/damaged files is provided to an administrator in order to facilitate a manual restore from backup of the lost/damaged file(s). For each of the lost/damaged file(s), a most recent version of the file may be automatically retrieved from a backup location. Alternatively, a policy may be set by the system that automatically decides how to handle lost or damage files. In one example, such a policy would progress in two phases: (1) the system automatically enables the user to access to the lost or damaged file; (2) the user or administrator decides if they want to use the lost/damaged file or the old (restored) file.

In certain embodiments, the Determining and Identification Functions include identifying a set of lost/damaged files where, for each file in the set, the maximum limit for reconstruction of the file stored using the file level implementation of the RAID-X format has been exceeded. In this embodiment, a list of the set of lost/damaged files is provided to the administrator in order to facilitate a manual restore from backup of the files in the set. For each lost/damaged file in the set, if an online backup copy of the file is available from a backup location, a most recent version of the file may be automatically retrieved from the backup location (e.g., an automatically-mounted backup tape, a manually-mounted backup tape, a remote archive copy of the file, a local archive copy of the file, a remote mirror copy of the file, or a local mirror copy of the file.)

In certain embodiments, data storage system 100 maintains at least one point-in-time copy of at least part of an image of the data storage system, and the system reverts to a most recent version of the point-in-time copy prior to providing the list of the one or more lost/damaged files to the administrator and/or automatically retrieving the most recent version of the file from the backup location. For purposes of this disclosure, a "point-in-time copy" of at least part of an image of the data storage system refers to a replica of the contents of the data storage system that is consistent at a specified point in time. It is sometimes also referred to as a "snapshot" or "snapshot copy". The point-in-time copy may be a most recent version of a complete point-in-time copy of an image of data storage system 100.

In embodiments where the data storage system maintains at least one point-in-time copy of at least part of an image of the data storage system, each file retrieved from a most recent version of the point-in-time copy is optionally tagged. "Tagging" generally implies simply attaching some metadata the tag) to an item to indicate that it belongs to a particular set or has a particular attribute. In addition to simply "tagging" restored files, the system optionally treats files so tagged in a special way. For example, the tagging can be used to render each tagged file inaccessible until a tag is removed from the file, trigger a warning when a tagged file is accessed, deny access to each tagged file, audit-log access to each tagged file, permit access to a tagged file only if the access is accompanied by an override flag, allow access to a tagged file only if an administrator provides an override, and/or interactively query a user whether use of a tagged file is acceptable. Optionally, tagging is only applied to those files retrieved from the most recent version of a point-in-time copy which correspond to a lost/damaged file modified after a time when such point-in-time copy was made. Where retrieved files are tagged, information associated with tagged files retrieved from the most recent version of the point-in-time copy is optionally reviewed (e.g., manually, by an administrator), and based on the reviewing, a determination is made whether to restore a lost/damaged file from the most recent version of the point-in-time copy, delete the lost/damaged file, or use the lost/damaged file in a damaged state.

While the methods and systems set forth above have been described in the context of restoring lost/damaged files, the methods and systems set forth herein may also be applied to restore a portion of a lost/damaged file. For example, where a large file has been striped across multiple parity groups in a file level implementation of a RAID-X format, and only a portion of the file has been lost/damaged (e.g., corresponding to one of the parity groups), the methods and systems described above may be used to restore only the lost/damaged portion of the large file while leaving the remaining portions of the large file intact.

C. Directory Encoding where a Raid-X Format is Implemented at a File Level

A further aspect of the present invention is also applicable in the context of: (i) a distributed, object-based data storage system (such as the one shown in FIG. 1) where each of the storage devices is an object-based storage device (e.g., OBDs 20) and one or more nodes (e.g., clients 30) that access files from the storage devices, (ii) where a RAID-X format is implemented at a file level within the plurality of storage devices, and (iii) where N represents a maximum limit of failures beyond which reconstruction of a file stored using the file level implementation of the RAID-X format is not possible. Here, a directory is encoded for each of a plurality of files stored on the storage system, and a map is encoded that includes a list of storage devices where components of the directory associated with the map reside. The encoding of the directory is performed using a RAID-X format that can tolerate at least N+1 failures prior to being unable to reconstruct the directory.

Figure 6:
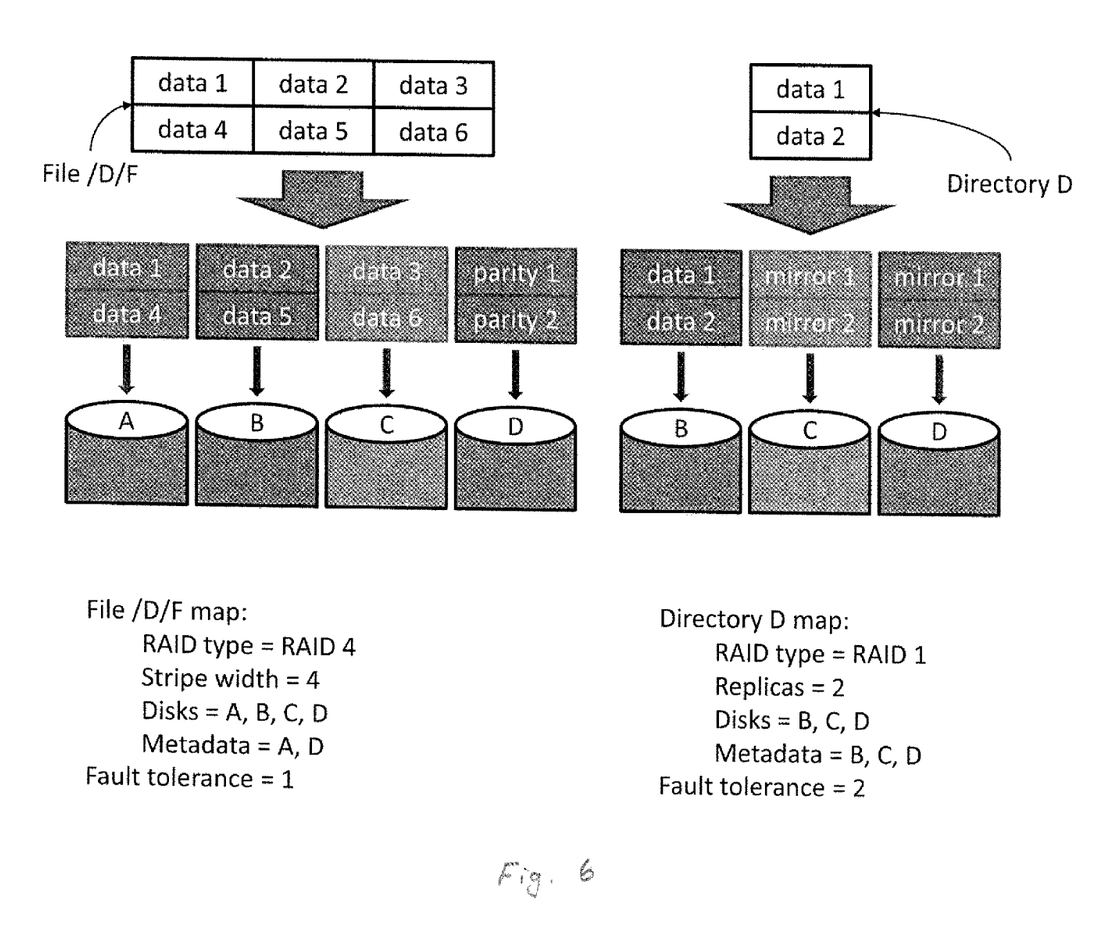
FIG. 6 illustrates an example of encoding a directory such that it can tolerate more failures than any file represented in the directory.

An example of a directory encoded in accordance with this aspect of the invention is shown in FIG. 6. More specifically, FIG. 6 shows the encoding a directory such that it can tolerate more failures than any file represented in the directory. In the example of FIG. 6, directory D contains a file /D/F. /D/F is stored using a RAID-4 algorithm, which can tolerate 1 failure without losing data. The directory /D is stored using a RAID-1 algorithm with 2 replicas, which can tolerate 2 failures without losing data.

D. Improved Metadata Storage where a Raid-X Format is Implemented at a File Level A further aspect of the present invention can be applied in the context of: (i) a data storage system (such as the one shown in FIG. 1) that includes a plurality of storage devices (e.g., OBDs 20) and one or more nodes (e.g., clients 30) that access files from the storage devices, (ii) where a RAID-X format is implemented at a file level within the plurality of storage devices. Here, a directory (D) is stored on a set of storage devices (e.g., OBDs 20) such that no file or subdirectory contained in D has associated metadata on the exact same set of storage devices where D is stored. Metadata of each child of D includes a back-pointer to D that identifies at least a parent directory and a filename in the parent directory. If all storage devices in the set used to store D fail, all children of D have at least one surviving metadata component which can be used to identify locations in a filesystem namespace associated with the data storage system of all of said children.

Figure 7:
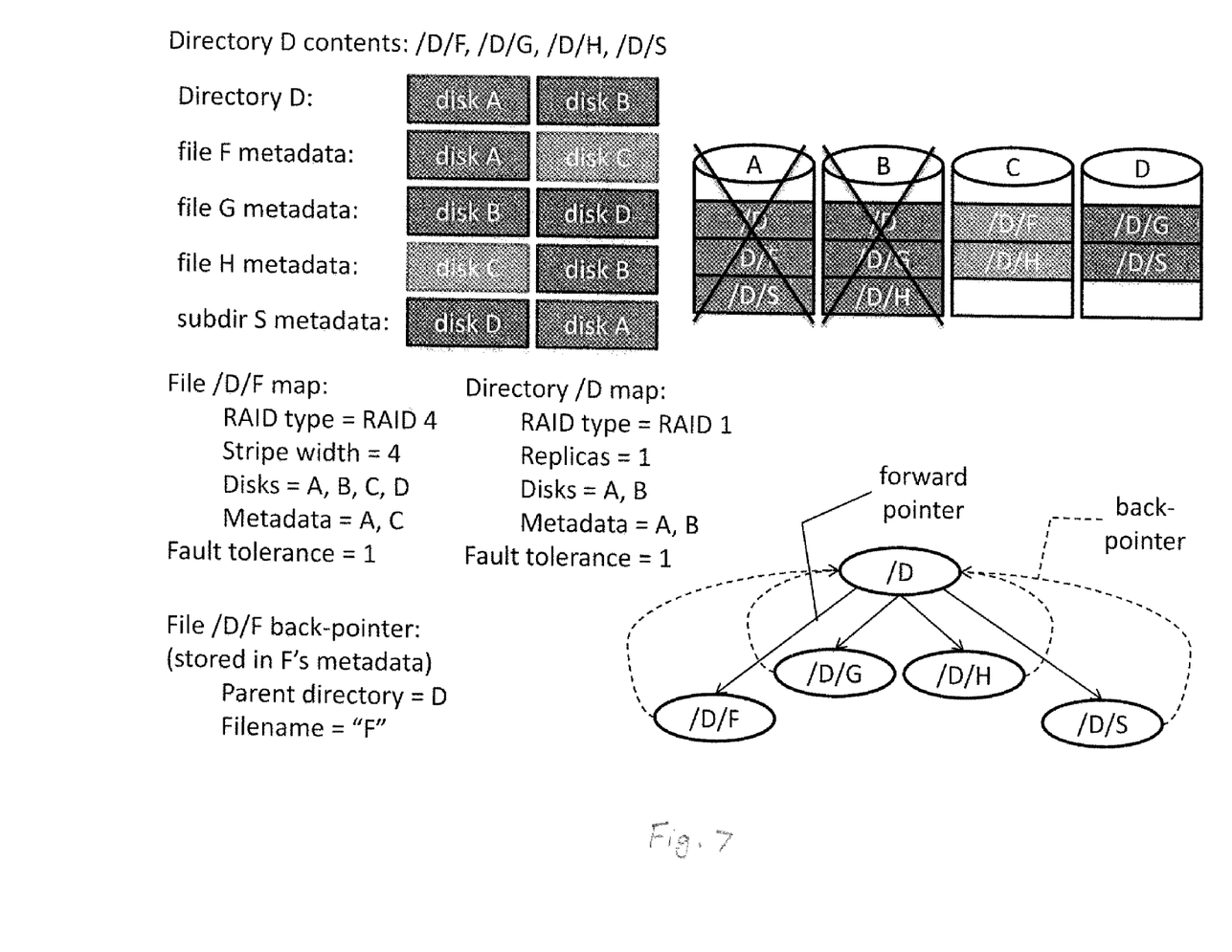
FIG. 7 illustrates an example of storing a directory on storage devices that are different from the ones used to store metadata associated with files represented in the directory.

An example illustrating storage of a directory on storage devices that are different from the ones used to store metadata associated with files represented in the directory, is shown in FIG. 7. In the example of FIG. 7, directory /D logically contains files /D/F, /D/G, /D/H, and subdirectory /D/S. Directory /D is physically stored using a RAID-1 algorithm with 1 replica, and is assigned to disks A and B. Each item logically contained in /D has two copies of its metadata physically stored on disks from the set {disk A, disk B, disk C, disk D} as shown in the figure. Each item includes in its metadata a back-pointer to its parent directory, /D, and a copy of its filename relative to /D (e.g., /D/F's filename is "F"). As shown in the upper right portion of FIG. 7, even if both disks containing /D fail (disk A and disk B), which results in the loss of that directory, there is at least one surviving copy of the metadata for each item contained in /D. Since this metadata contains sufficient information to identify the file in the namespace (parent directory and filename), it is possible to identify the set of files that were contained in /D by scanning the surviving metadata, even though the directory contents of /D were lost.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a data storage system that includes a plurality of storage devices, and one or more nodes that access files from the storage devices, wherein a RAID-X format is implemented at a file level within the plurality of storage devices, and wherein N represents a maximum limit of failures beyond which reconstruction of a file stored using the file level implementation of the RAID-X format is not possible, a method comprising:

encoding a directory for each of a plurality of files stored on the storage system, and a map that includes a list of storage devices where components of the directory associated with the map reside; and wherein the encoding of the directory is performed using a RAID-X format that can tolerate at least N+1 failures prior to being unable to reconstruct the directory; and wherein the data storage system is a distributed, object-based data storage system, and each of the storage devices is an object-based storage device.

2. In a data storage system that includes a plurality of storage devices, and one or more nodes that access files from the storage devices, wherein a RAID-X format is implemented at a file level within the plurality of storage devices, a method comprising:

storing a directory (D) on a set of storage devices such that no file or subdirectory contained in D has associated metadata on the exact same set of storage devices where D is stored; and wherein metadata of each child of D includes a back-pointer to D that identifies at least a parent directory and a filename in said parent directory;

whereby, if all storage devices in the set used to store D fail, all children of D have at least one surviving metadata component which can be used to identify locations in a filesystem namespace associated with the data storage system of all of said children.

3. The method of claim 2, wherein the data storage system is a distributed, object-based data storage system, and each of the storage devices is an object-based storage device.

* * * * *